(12) United States Patent
Yoon

(10) Patent No.: US 9,810,318 B2
(45) Date of Patent: Nov. 7, 2017

(54) METHOD FOR CONTROLLING EOP OF TORQUE ASSIST AMT

(71) Applicant: Hyundai Motor Company, Seoul (KR)

(72) Inventor: Young Min Yoon, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/720,425

(22) Filed: May 22, 2015

(65) Prior Publication Data

US 2016/0138707 A1    May 19, 2016

(30) Foreign Application Priority Data

Nov. 19, 2014    (KR) ........................ 10-2014-0161317

(51) Int. Cl.
| | |
|---|---|
| *B60W 10/04* | (2006.01) |
| *F16H 61/04* | (2006.01) |
| *F16H 61/00* | (2006.01) |
| *F16H 61/684* | (2006.01) |

(52) U.S. Cl.
CPC ......... *F16H 61/0403* (2013.01); *F16H 61/04* (2013.01); *F16H 61/684* (2013.01); *F16H 2061/0096* (2013.01); *F16H 2061/0429* (2013.01)

(58) Field of Classification Search
CPC ......... F16H 61/0403; F16H 2061/0096; F16H 61/0267; F16H 61/0031; F16H 61/143
See application file for complete search history.

(56) References Cited

U.S. PATENT DOCUMENTS

| | | | | |
|---|---|---|---|---|
| 5,611,752 A | * | 3/1997 | Kamada .............. | F16H 61/0251 477/156 |
| 2002/0107103 A1 | * | 8/2002 | Nakamori .............. | B60K 6/365 475/116 |
| 2014/0371960 A1 | * | 12/2014 | Lee ......................... | F04B 49/06 701/22 |
| 2015/0019073 A1 | * | 1/2015 | Lee ....................... | B60W 10/06 701/36 |
| 2015/0226319 A1 | * | 8/2015 | Miyamoto .......... | F16H 57/0413 701/58 |

FOREIGN PATENT DOCUMENTS

| | | |
|---|---|---|
| JP | 2003-35360 A | 2/2003 |
| JP | 2004-3625 A | 1/2004 |
| JP | 2010-265978 A | 11/2010 |
| KR | 10-2009-0045990 A | 5/2009 |
| KR | 10-2012-0063258 A | 6/2012 |
| KR | 10-2012-0064449 A | 6/2012 |
| KR | 10-2013-0115618 A | 10/2013 |

* cited by examiner

*Primary Examiner* — David J Hlavka
(74) *Attorney, Agent, or Firm* — Morgan Lewis & Bockius LLP

(57) ABSTRACT

A method for controlling an electric oil pump (EOP) of a torque assist automated manual transmission (AMT) using a multi-plate wet clutch and a dry clutch, may include correcting an EOP operating line on a shifting pattern graph such that the EOP operates prior to up-shifting from a first gear to a second gear while driving in the first gear.

6 Claims, 5 Drawing Sheets

METHOD FOR CONTROLLING EOP OF TORQUE ASSIST AMT

CROSS REFERENCE TO RELATED APPLICATION

The present application claims priority of Korean Patent Application Number 10-2014-0161317 filed on Nov. 19, 2014, the entire contents of which application are incorporated herein for all purposes by this reference.

BACKGROUND OF THE INVENTION

Field of the Invention

The present invention relates, in general, to a method for controlling an electric oil pump (EOP) of a torque assist automated manual transmission (AMT) and, more particularly, to a technique capable of providing an optimized operation method of an EOP by using a multi-plate wet clutch when performing shifting from a low speed or gear where torque fluctuation is large due to use of a torque assist ATM.

Description of Related Art

In an automated manual transmission (AMT), shifting is automatically performed by an actuator during driving of a vehicle, thus providing driving convenience that is similar to that in an automatic transmission and contributing to improvement in the fuel efficiency of the vehicle owing to the mechanical efficiency of power transmission, which is superior to that of the automatic transmission.

Such an AMT is a device in which by using an electro-hydraulic actuator in addition to an existing manual transmission, shifting is automatically performed based on gear control through a transmission control unit (TCU) without assistance from the vehicle driver.

FIG. 1 schematically illustrates a torque assist AMT system of a related art to which the present invention is applied as well. Torque transferred from an engine 1 is selectively transferred to the transmission through intermittence of a dry clutch 3 and an assist clutch 5, and through the intermittence of the dry clutch 3, first, third, fourth, and fifth speeds or gears are formed, and through the intermittence of the assist clutch 5, a second gear is formed.

For example, during low-gear driving where the first or third shifting gear is formed, shifting to the second gear may be performed through control of handover between the dry clutch 3 and the assist clutch 5, preventing a torque drop occurring during shifting to the second gear and thus preventing torque interruption during shifting.

The assist clutch 5 is a wet clutch capable of forming oil pressure through an EOP 11, and applies oil pressure to the assist clutch 5 through hydraulic control with a solenoid valve 13. The assist clutch additionally maintains the applied oil pressure.

Meanwhile, a torque assist AMT system performs double-clutch shifting by using a wet clutch (a multi-plate wet clutch) from a low gear where torque fluctuation is large, and performs single-clutch shifting merely using a wet clutch at a high gear where torque fluctuation is relatively small. Thus, in low-gear shifting the EOP is used such that optimized driving of the EOP is a critical factor determining the efficiency and fuel efficiency of the torque assist AMT system.

Therefore, the present invention provides a method for controlling an EOP for a torque assist AMT to achieve optimized driving of the EOP in low-gear shifting.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a method for controlling an EOP for a torque assist AMT to achieve optimized driving of the EOP in low-gear shifting of a torque assist AMT system.

In order to accomplish the above object, the present invention provides a method for controlling an EOP of a torque assist AMT. To this end, a method for controlling an electric oil pump (EOP) of a torque assist automated manual transmission (AMT) using a multi-plate wet clutch and a dry clutch includes correcting an EOP operating line on a shifting pattern graph such that the EOP operates prior to up-shifting to a second gear during first-gear driving.

The EOP operating line applied in shifting from a first gear to a second gear on the shifting pattern graph is a result of translating an up-shifting graph from the first gear to the second gear to the left in parallel by a predetermined first reference value.

The first reference value is a mean value of a vehicle speed per accelerator opening rate of the up-shifting graph from the first gear to the second gear.

A releasing line of the EOP is a result of translating a down-shifting graph from the second gear to the first gear to the left in parallel by a predetermined second reference value on the shifting pattern graph.

The second reference value is a mean value of a vehicle speed per accelerator opening rate of the down-shifting graph from the second gear to the first gear.

The EOP operates prior to down-shifting to the second gear during third-gear driving.

The EOP operating line applied in a shifting pattern between the second gear and the third gear on the shifting pattern graph is located between a down-shifting graph from the third gear to the second gear and a down-shifting graph from the fourth gear to the third gear.

The EOP operating line is formed by an average value of a sum of vehicle speeds per accelerator opening rate of the down-shifting graph from the third gear to the second gear and the down-shifting gear from the fourth gear to the third gear.

The EOP releasing line is located to the right of the up-shifting graph from the second gear to the third gear on the shifting pattern graph during third-gear driving, and the EOP-releasing line is formed by an average value of a sum of vehicle speeds per accelerator opening rate of the up-shifting graph from the second gear to the third gear and the up-shifting gear from the third gear to the fourth gear.

The present invention also provides a method for controlling an EOP of a torque assist AMT, the method including detecting a shifting gear of a currently driven vehicle, determining whether the EOP operates if the detected shifting gear is a first gear or a third gear, calculating a releasing vehicle speed of the EOP if the EOP operates, and releasing the EOP if the releasing vehicle speed of the EOP is higher than a speed of the currently driven vehicle.

The determining of whether the EOP operates if the detected shifting gear is the first gear or the third gear includes: if the EOP does not operate, calculating an operating vehicle speed of the EOP and operating the EOP if the speed of the currently driven vehicle is higher than the operating vehicle speed of the EOP.

The detecting of the shifting gear of the currently driven vehicle includes operating the EOP if the detected shifting gear is a second gear and releasing the EOP if the detected shifting gear is a fourth gear or a fifth gear, or a reverse gear.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
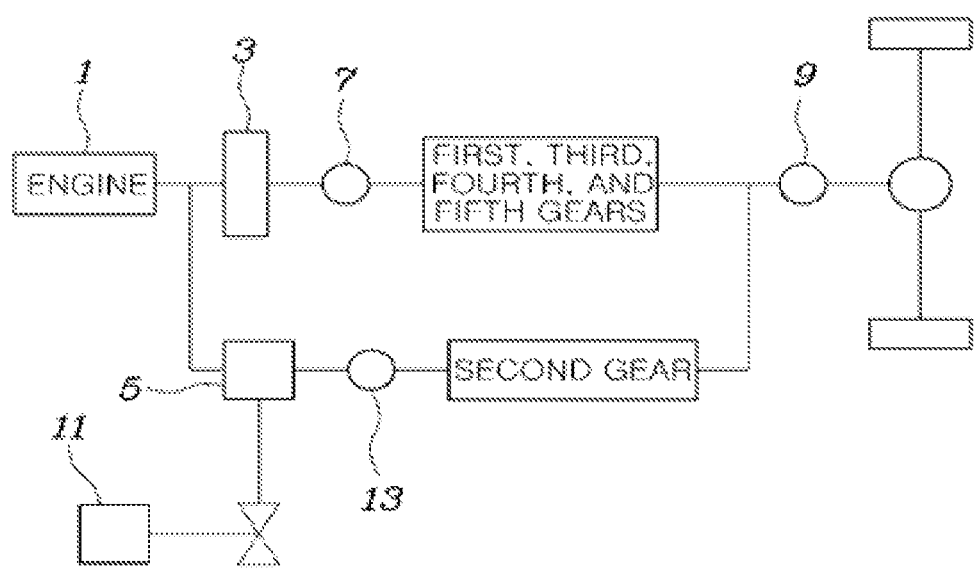
FIG. 1 schematically illustrates a torque assist AMT system of a related art to which the present invention is applied as well.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, embodiments of the present invention will be described in detail with reference to the attached drawings.

Reference now should be made to the drawings, in which the same reference numerals are used throughout the different drawings to designate the same or similar components.

Hereinbelow, exemplary embodiments of a method for controlling an EOP of a torque assist AMT according to an exemplary embodiment of the present invention will be described with reference to the accompanying drawings.

Figure 2:
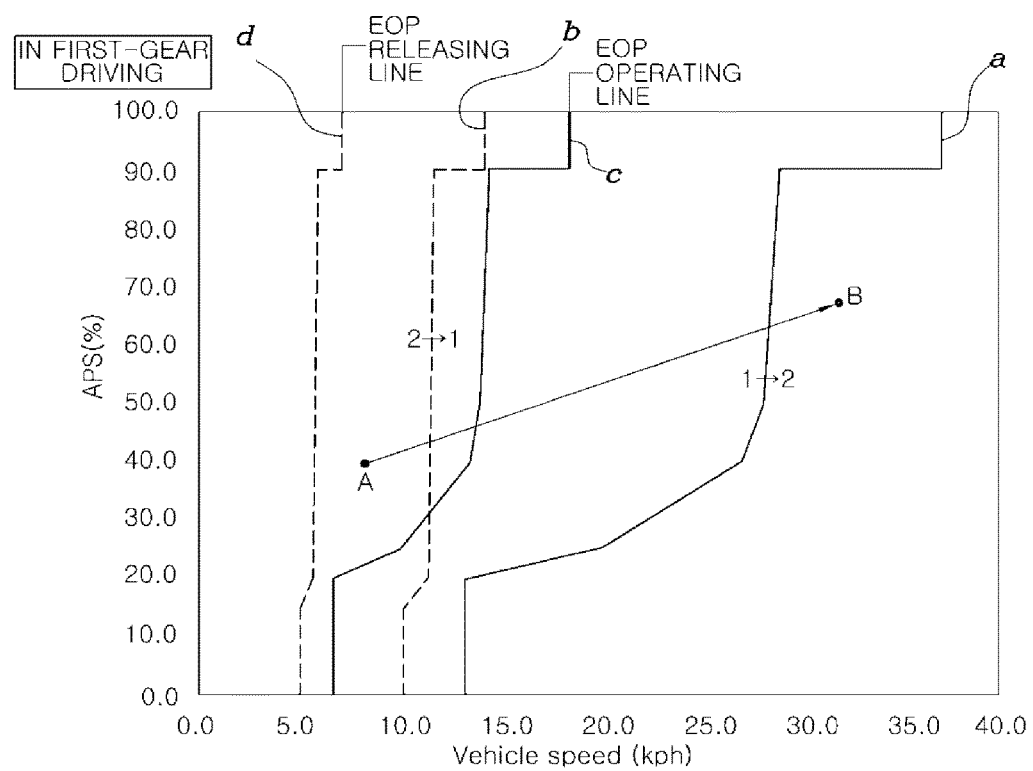
FIG. 2 is a shifting pattern graph in which an EOP operating line and an EOP releasing line are applied during shifting between a first gear and a second gear according to an exemplary embodiment of the present invention.

FIG. 2 illustrates a shifting pattern graph in which an EOP operating line and an EOP releasing line are applied during shifting between a first gear and a second gear according to an exemplary embodiment of the present invention.

As is shown, a method for controlling an EOP of a torque assist AMT using a multi-plate wet clutch and a dry clutch, includes correcting an operating line of the EOP on a shifting pattern graph such that the EOP operates prior to up-shifting from a first gear to a second gear while driving in the first gear.

Meanwhile, in the shifting pattern graph shown in FIG. 2, a graph 'a' indicates an up-shifting graph from a first gear to a second gear, a graph 'b' indicates a down-shifting graph from the second gear to the first gear, a graph 'c' indicates a graph of an EOP-operating line, and a graph 'd' indicates a graph of an EOP-releasing line.

As is shown, according to an exemplary embodiment of the present invention, the EOP-operating line is located to the left of the up-shifting graph from the first gear to the second gear.

For example, when a vehicle speed gradually increases from 'A' to 'B', and thus shifting is performed from the first gear to the second gear, the vehicle speed necessarily passes through the EOP-operating line, such that the EOP is driven prior to shifting from the first gear to the second gear.

That is, to travel while up-shifting from the first gear to the second gear, a vehicle having mounted thereon a torque assist AMT using a multi-plate wet clutch and a dry clutch has to use the multi-plate wet clutch. Therefore, rapid shifting may be achieved by operating the EOP in advance before up-shifting from the first gear to the second gear. For this reason, the EOP operating line has been corrected in such a way that the EOP operates prior to shifting to the second gear during first-gear driving.

On the shift pattern graph, the EOP-operating line applied in shifting between the first gear and the second gear is a result of translating the up-shifting graph from the first gear to the second gear to the left in parallel by a predetermined first reference value.

The first reference value is determined as 1/N of a vehicle speed per accelerator opening rate of the up-shifting graph from the first gear to the second gear. 'N' is determined according to a response of oil pressure formation corresponding to EOP operation, and 'N' is preferably set to a mean value (N=2) of a vehicle speed per accelerator opening rate of the up-shifting graph from the first gear to the second gear.

That is, if the EOP operating line is set to 'N=2', the up-shifting graph from the first gear to the second gear is translated to the left in parallel by a mean value of each position of the up-shifting graph from the first gear to the second gear.

Meanwhile, as shown in FIG. 2, the EOP releasing line is a result of translating the down-shifting graph from the second gear to the first gear to the left in parallel by a predetermined second reference value on the shifting pattern graph, and the second reference value is a mean value of a vehicle speed per accelerator opening rate of the down-shifting graph from the second gear to the first gear.

As already described, the second reference value is also determined as 1/N of the vehicle speed per accelerator opening rate of the down-shifting graph from the second gear to the first gear, and 'N' is preferably set to a mean value (N=2) of the vehicle speed per accelerator opening rate of the down-shifting graph from the second gear to the first gear.

That is, if the EOP operating line is set to 'N=2', the down-shifting graph from the second gear to the first gear is translated to the left in parallel by a mean value of each position of the down-shifting graph from the second gear to the first gear.

Meanwhile, according to the shifting pattern graph according to an exemplary embodiment of the present invention in which the EOP operating line and the EOP releasing line are corrected, since the multi-plate wet clutch has to be used during second-gear driving, the EOP operates at all times.

Figure 3:
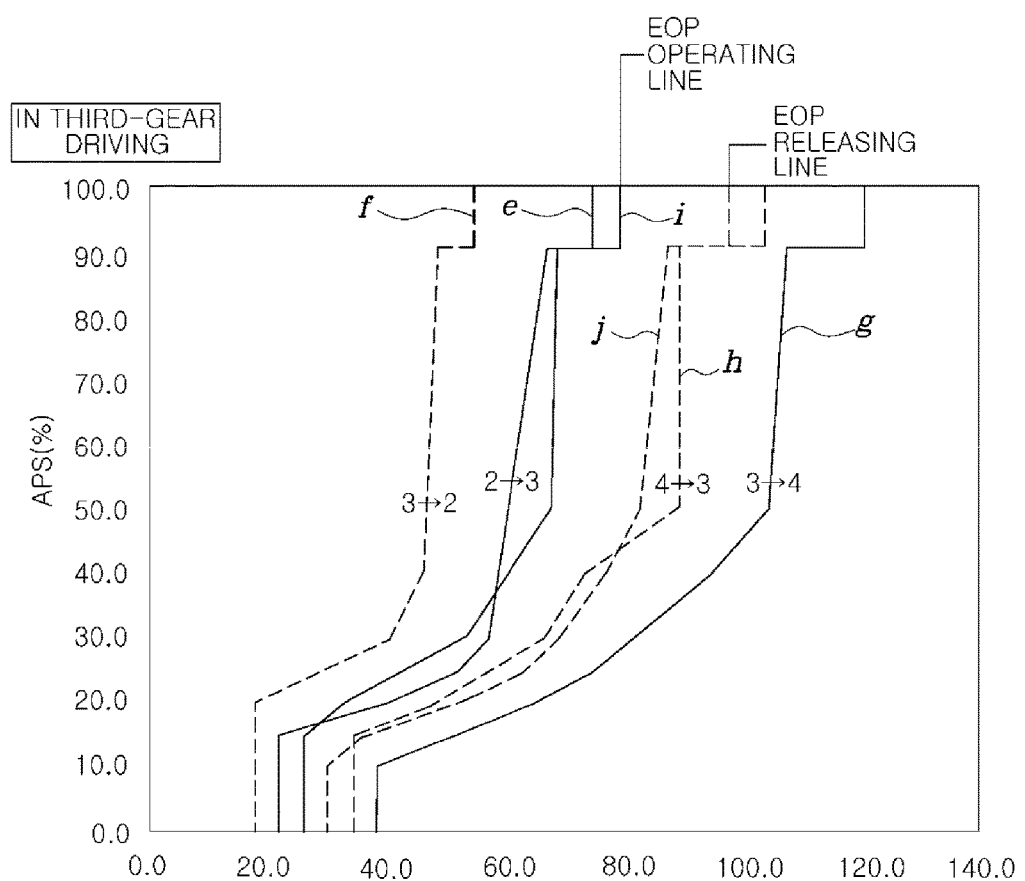
FIG. 3 is a graph illustrating a shifting pattern during third-gear driving.

FIG. 3 illustrates a shifting pattern graph in which the EOP operating line and the EOP releasing line are applied during shifting between the second gear and the third gear or between the third gear and the fourth gear, according to an exemplary embodiment of the present invention.

As shown in FIG. 3, according to an exemplary embodiment of the present invention, during third-gear driving, the EOP operates prior to down-shifting to the second gear.

In the shifting pattern graph shown in FIG. 3, a graph 'e' indicates an up-shifting graph from the second gear to the third gear, a graph 'f' indicates a down-shifting graph from the third gear to the second gear, a graph 'g' indicates an up-shifting graph from the third gear to the fourth gear, and a graph 'h' indicates a down-shifting graph from the fourth gear to the third gear.

A graph 'i' indicates a graph of an EOP-operating line, and a graph 'j' indicates a graph of an EOP-releasing line.

As shown in FIG. 3, according to an exemplary embodiment of the present invention, the EOP-operating line graph is located to the right of the down-shifting graph from the third gear to the second gear.

That is, since the multi-plate wet clutch is not used during third-gear driving, the EOP is released in principle, but for down-shifting from the third gear to the second gear, by operating the EOP prior to the down-shifting, rapid shifting may be achieved.

On the shifting pattern graph, the EOP-operating line applied in the shifting pattern between the second gear and the third gear is located between the down-shifting graph from the third gear to the second gear and the down-shifting graph from the fourth gear to the third gear, and the EOP operating line is formed by an average value of a sum of vehicle speeds per accelerator opening rate of the down-shifting graph from the third gear to the second gear and the down-shifting graph from the fourth gear to the third gear.

That is, the EOP-operating line is determined as 1/N of a sum of vehicle speeds per accelerator opening rate of the down-shifting graph from the third gear to the second gear and the down-shifting graph from the fourth gear to the third gear, and 'N' is determined according to a response of oil pressure formation corresponding to EOP operation, such that 'N' increases for a rapid EOP response and decreases for a slow EOP response.

Preferably, 'N' is set to a mean value (N=2), such that the EOP-operating line is located between the down-shifting graph from the fourth gear to the third gear and the down-shifting graph from the third gear to the second gear.

Meanwhile, during third-gear driving, the EOP releasing line is located to the right of the up-shifting graph from the second gear to the third gear on the shifting pattern graph, and as already described, the EOP releasing line is formed by an average value of a sum of vehicle speeds per accelerator opening rate of the up-shifting graph from the second gear to the third gear and the up-shifting graph from the third gear to the fourth gear.

The EOP releasing line is also determined as 1/N of a sum of vehicle speeds per accelerator opening rate of the up-shifting graph from the third gear to the fourth gear and the up-shifting graph from the second gear to the third gear. 'N' is determined according to a response of oil pressure formation corresponding to EOP operation, such that 'N' increases for a rapid EOP response and decreases for a slow EOP response.

Preferably, 'N' is set to a mean value (N=2), such that the EOP-releasing line is located between the up-shifting graph from the third gear to the fourth gear and the up-shifting graph from the second gear to the third gear.

Referring to FIGS. 2 and 3 together, a method for controlling an electric oil pump (EOP) of a torque assist automated manual transmission (AMT) using a multi-plate wet clutch and a dry clutch, the method comprising; as a vehicle speed increases, starting to drive, by a controller, the EOP at the first vehicle speed lower than the vehicle speed at which the vehicle is upshifted to the second stage from the first stage, maintaining the driving of the EOP at the second stage, and after upshifting from the second stage to the third stage, stopping driving the EOP in the second vehicle speed lower than the vehicle speed upshifting from the third stage to the fourth stage.

Further, as the vehicle speed decreases, the controller starts to drive the EOP at a third vehicle speed that is higher than the vehicle speed at which the vehicle is downshifted to the second stage in the state where the EOP driving is stopped while the third stage traveling, maintaining the driving of the EOP at the second stage, and after downshifting from the second stage to the first stage, stopping driving the EOP in the fourth vehicle speed lower than the vehicle speed downshifting from the second stage to the first stage.

The first vehicle speed at which the driving of EOP is started during the first stage traveling may be a vehicle speed obtained by subtracting the first constant value from the 1-2 upshift vehicle speed, and the second vehicle speed at which the driving of the EOP is stopped at the third stage traveling may be a vehicle speed obtained by subtracting the second constant value from the 3-4 upshift vehicle speed.

For example, when the first constant value is set to 10, and if the Acceleration-pedal Position Sensor (APS) signal value is 30% and the 1-2 upshift vehicle speed is 23 kph, the first vehicle speed becomes 13 kph, and if the APS signal value is 50% and the 1-2 upshift vehicle speed is 27 kph, the first vehicle speed becomes 17 kph.

Meanwhile, when the second constant value is set to 20, and if the APS signal value is 30% and the 3-4 upshift vehicle speed is 85 kph, the second vehicle speed becomes 65 kph, and if the APS signal value is 50% and the 3-4 upshift vehicle speed is 103 kph, the second vehicle speed becomes 83 kph.

The third vehicle speed at which the driving of the EOP is started during the three stage traveling may be a vehicle speed obtained by adding the third constant value to the 3-2 downshift vehicle speed, and the fourth vehicle speed at which the driving of the EOP is stopped during the first stage traveling may be a vehicle speed obtained by subtracting the fourth constant value from the 2-1 downshift vehicle speed.

For example, when the third constant value is set to 10, and if the APS signal value is 30% and the 3-2 downshift vehicle speed is 40 kph, the third vehicle speed becomes 50 kph, and if the APS signal value is 50% and the 3-2 downshift vehicle speed is 48 kph, the third vehicle speed becomes 58 kph.

Also, when the fourth constant value is set to 5, and if the APS signal value is 10% and the 2-1 downshift vehicle speed is 10 kph, the fourth vehicle speed becomes 5 kph, and if the APS signal value is 40% and the 2-1 downshift vehicle speed is 12 kph, the fourth vehicle speed becomes 7 kph.

The first vehicle speed at which the driving of the EOP is started during the first stage traveling may be a vehicle speed obtained by subtracting the first rate of the 1-2 upshift vehicle speed from the 1-2 upshift vehicle speed, and the second vehicle speed at which the driving of the EOP is stopped at the third stage traveling may be a vehicle speed obtained by subtracting a second rate of the difference between the 3-4 upshift vehicle speed and the 2-3 upshift vehicle speed from the 3-4 upshift vehicle speed.

For example, when the first ratio is set to 1/2, and if the APS signal value is 30% and the 1-2 upshift vehicle speed is 23 kph, the first vehicle speed becomes 11.5 kph, and if the APS signal value is 50% and the 1-2 upshift vehicle speed is 27 kph, the first vehicle speed becomes 13.5 kph.

Further, when the second ratio is set to 1/2, and if the APS signal value is 30%, the 3-4 upshift vehicle speed is 85 kph, and the 2-3 upshift vehicle speed is 55 kph, the second vehicle speed is 85−(85−55)/2=60 kph, and if the APS signal value is 50%, the 3-4 upshift vehicle speed is 103 kph, and the 2-3 upshift vehicle speed is 63 kph, the second vehicle speed becomes 103−(103−63)/2=83 kph.

The third vehicle speed at which the driving of the EOP is started during the three stage traveling may be a vehicle speed obtained by adding the third rate of the difference between the 4-3 downshift vehicle speed and the 3-2 downshift vehicle speed to the 3-2 downshift vehicle speed, and the fourth vehicle speed at which the driving of the EOP is stopped during the first stage traveling may be a vehicle speed obtained by subtracting the fourth rate of the 2-1 downshift vehicle speed from the 2-1 downshift vehicle speed.

For example, when the third ratio is set to 1/2, and if the APS signal value is 30%, the 3-2 downshift vehicle speed is 40 kph, and the 4-3 downshift vehicle speed is 65 kph, the third vehicle speed is 40+(50−40)/2=45 kph, and if the APS signal value is 50%, the 3-2 downshift vehicle speed is 48 kph, and the 4-3 downshift vehicle speed is 88 kph, the third vehicle speed is 48+(88−48)/2=68 kph.

And, when the fourth ratio is set to 1/2, and if the APS signal value is 10% and the 2-1 downshift vehicle speed is 10 kph, the fourth vehicle speed becomes 5 kph, and if the APS signal value is 40% and the 2-1 downshift vehicle speed is 12 kph, the fourth vehicle speed becomes 6 kph.

Figure 4:
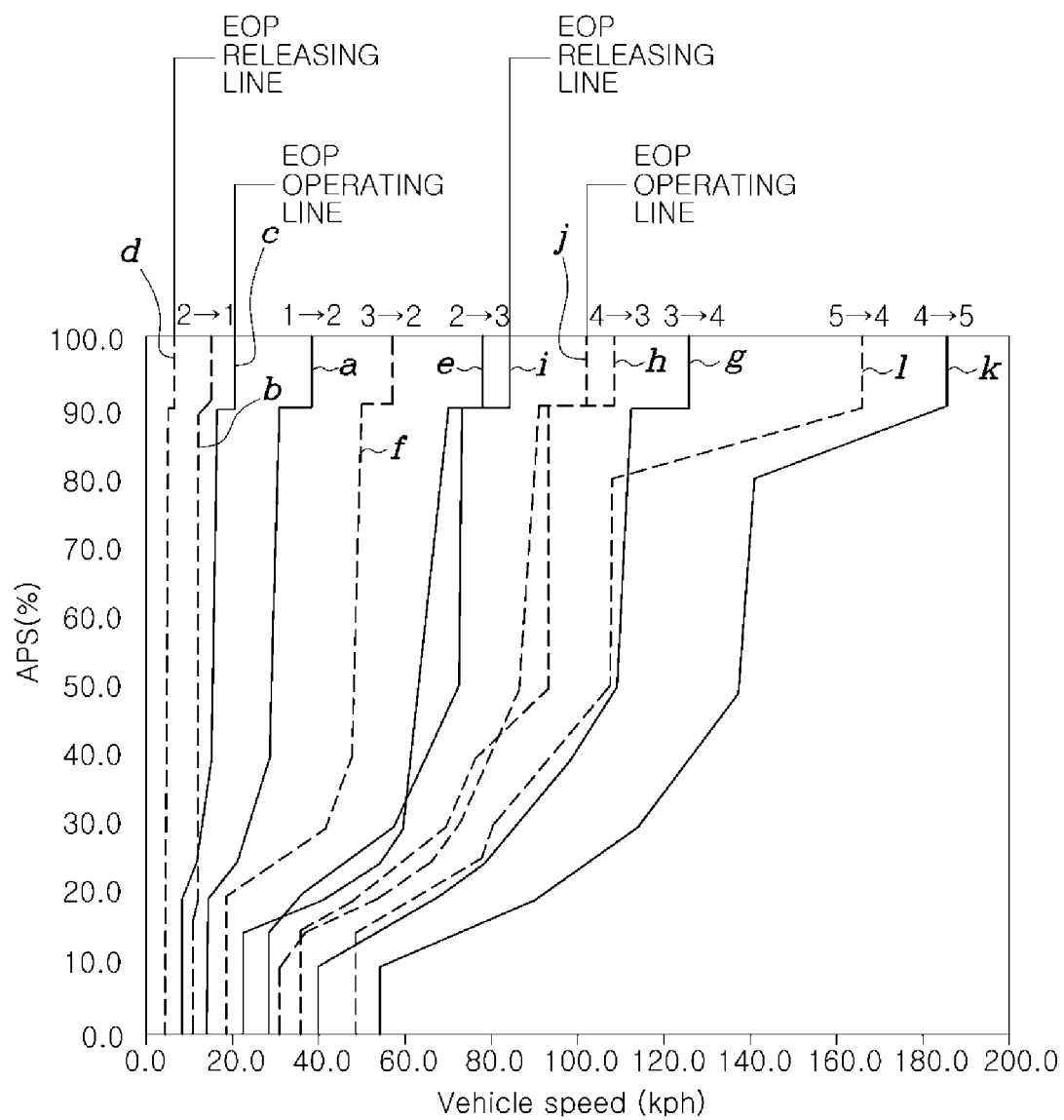
FIG. 4 is a graph illustrating a shifting pattern in which an EOP operating line and an EOP releasing line are applied during shifting from first to fifth gears.

FIG. 4 is a graph illustrating a shifting pattern in which an EOP operating line and an EOP releasing line are applied during shifting from first to fifth gears, in which a graph 'k' indicates an up-shifting graph from the fourth gear to the fifth gear and a graph 'l' indicates a down-shifting graph from the fifth gear to the fourth gear.

During driving along the shifting pattern graph in which the EOP operating line and the EOP releasing line are corrected according to an exemplary embodiment of the present invention, in fourth-gear driving, for shifting from the fourth gear to the second gear or from the fifth gear to the second gear and kick-down shifting, the multi-plate wet clutch is used, but in a so-called 'inertia' period where an engine speed increases in the initial stage of shifting, oil pressure needs to be formed by operating the EOP such that in fourth-gear and fifth-gear driving the EOP is released.

Figure 5:
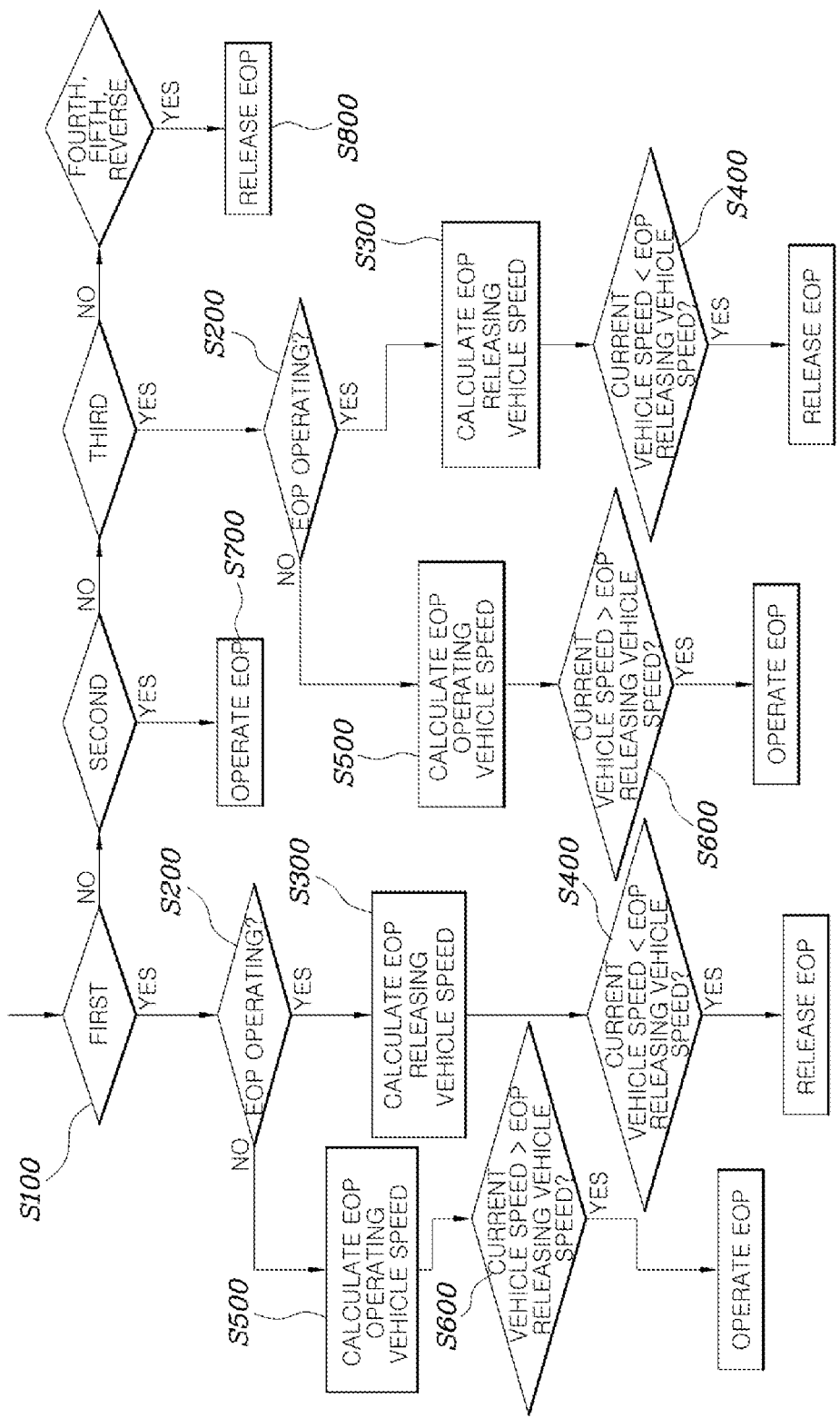
FIG. 5 is a flowchart illustrating operations performed time-sequentially according to an exemplary embodiment of the present invention.

FIG. 5 is a flowchart illustrating, over time, operation and release of the EOP, which are implemented by the shifting pattern graph in which the EOP operating line and the EOP releasing line are corrected according to an exemplary embodiment of the present invention.

As is shown, the present invention includes operation S100 of detecting a shifting gear of a currently driven vehicle, operation S200 of determining whether the EOP operates if the detected shifting gear is the first gear or the third gear, operation S300 of calculating a EOP releasing vehicle speed if the EOP operates, and operation S400 of releasing the EOP if the EOP releasing vehicle speed is higher than the speed of the currently driven vehicle.

The operation of determining whether the EOP operates if the detected shifting gear is the first gear or the third gear includes operation S500 of calculating an EOP operating vehicle speed if the EOP does not operate and operation S600 of operating the EOP if the speed of the currently driven vehicle is higher than the EOP operating vehicle speed.

The operation of detecting the shifting gear of the currently driven vehicle includes operation S700 of operating the EOP if the detected shifting gear is the second gear and operation S800 of releasing the EOP if the detected shifting gear is the fourth gear or the fifth gear.

The detailed operating process has already been described and thus will not be described at this time.

As described above, with the method for controlling the EOP of the torque assist AMT according to an exemplary embodiment of the present invention, optimized driving of the EOP is implemented in shifting from the low gear, thereby improving the efficiency and fuel efficiency of the AMT.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method for controlling an electric oil pump (EOP) of a torque assist automated manual transmission (AMT) using a multi-plate wet clutch and a dry clutch, the method comprising; as a vehicle speed increases, starting to drive, by a controller, the EOP at a first vehicle speed lower than a 1-2 upshift vehicle speed at which a vehicle is upshifted to a second stage from a first stage, maintaining the driving of the EOP at the second stage, and after upshifting from the second stage to a third stage, stopping driving the EOP in a second vehicle speed lower than a 3-4 upshift vehicle speed upshifting from the third stage to a fourth stage.

2. The method of claim 1, wherein as the vehicle speed decreases, the controller starts to drive the EOP at a third vehicle speed that is higher than a 3-2 downshift vehicle speed at which the vehicle is downshifted to the second stage from the third stage in a state where the EOP driving is stopped, maintaining the driving of the EOP at the second stage, and after downshifting from the second stage to the first stage, stopping driving the EOP in a fourth vehicle speed lower than a 2-1 downshift vehicle speed downshifting from the second stage to the first stage.

3. The method of claim 2, wherein the first vehicle speed at which the driving of EOP is started while the vehicle travels with the first stage is obtained by subtracting a first constant value from the 1-2 upshift vehicle speed, and the second vehicle speed at which the driving of the EOP is stopped while the vehicle travels with the third stage is obtained by subtracting a second constant value from the 3-4 upshift vehicle speed.

4. The method of claim 2, wherein the third vehicle speed at which the driving of the EOP is started while the vehicle travels with the three stage is obtained by adding a third constant value to the 3-2 downshift vehicle speed, and the fourth vehicle speed at which the driving of the EOP is stopped while the vehicle travels with the first stage is obtained by subtracting a fourth constant value from the 2-1 downshift vehicle speed.

5. The method of claim 2, wherein the first vehicle speed at which the driving of the EOP is started while the vehicle travels with the first stage is obtained by subtracting a first rate of the 1-2 upshift vehicle speed from the 1-2 upshift vehicle speed, and the second vehicle speed at which the driving of the EOP is stopped while the vehicle travels with the third stage is obtained by subtracting a second rate of a difference between the 3-4 upshift vehicle speed and a 2-3 upshift vehicle speed from the 3-4 upshift vehicle speed.

6. The method of claim 2, wherein the third vehicle speed at which the driving of the EOP is started while the vehicle travels with the three stage is obtained by adding a third rate of a difference between a 4-3 downshift vehicle speed and the 3-2 downshift vehicle speed to the 3-2 downshift vehicle speed, and the fourth vehicle speed at which the driving of the EOP is stopped while the vehicle travels with the first stage is obtained by subtracting a fourth rate of the 2-1 downshift vehicle speed from the 2-1 downshift vehicle speed.

* * * * *